(12) United States Patent
Endo

(10) Patent No.: US 11,462,150 B2
(45) Date of Patent: Oct. 4, 2022

(54) SEMICONDUCTOR APPARATUS

(71) Applicant: ROHM CO., LTD., Kyoto (JP)

(72) Inventor: Hiroharu Endo, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 89 days.

(21) Appl. No.: 16/936,522

(22) Filed: Jul. 23, 2020

(65) Prior Publication Data

US 2020/0357330 A1 Nov. 12, 2020

Related U.S. Application Data

(63) Continuation of application No. PCT/JP2019/001771, filed on Jan. 22, 2019.

(30) Foreign Application Priority Data

Jan. 24, 2018 (JP) .............................. JP2018-009812

(51) Int. Cl.
*G09G 3/20* (2006.01)
*H04N 17/02* (2006.01)

(52) U.S. Cl.
CPC ........... *G09G 3/2096* (2013.01); *H04N 17/02* (2013.01); *G09G 2310/08* (2013.01)

(58) Field of Classification Search
CPC ... G09G 3/2096; G09G 2310/08; H04N 17/02
See application file for complete search history.

(56) References Cited

U.S. PATENT DOCUMENTS 10,778,247 B2 * 9/2020 Kikuta .................. H04N 19/89

FOREIGN PATENT DOCUMENTS

| CN | 1774919 A | | 5/2006 | |
|----|-----------|---|--------|---|
| JP | H05235924 A | * | 9/1993 | ............... H04L 7/08 |
| JP | H06317782 A | | 11/1994 | |
| JP | 2002169524 A | | 6/2002 | |
| JP | 2002300598 A | | 10/2002 | |
| WO | 2017104346 A1 | | 6/2017 | |

OTHER PUBLICATIONS

International Preliminary Report on Patentability and Written Opinion of the International Searching Authority for International Application No. PCT/JP2019/001771; dated Jul. 28, 2020; dated Aug. 6, 2020.
International Search Report for International Application PCT/JP2019/001771; dated Apr. 9, 2019.
CNIPA The First Office Action for corresponding CN Application No. 201980009228.8; dated Jun. 25, 2021.
JPO Notice of Reasons for Refusal for corresponding JP Application No. 2019-567071; dated Aug. 31, 2021.
JPO Notice of Reasons for Refusal for corresponding JP Application No. 2019-567071; dated Feb. 15, 2022.

* cited by examiner

*Primary Examiner* — Xin Sheng
(74) *Attorney, Agent, or Firm* — Cantor Colburn LLP

(57) ABSTRACT

A video input interface of a semiconductor apparatus receives a digital video signal. A decoder extracts a packet command mapped in an RGB data format to a blind area that is included within an active area of the digital video signal and that is not to be displayed on a display panel, and decodes the packet command. A processing unit executes processing according to the packet command.

11 Claims, 10 Drawing Sheets

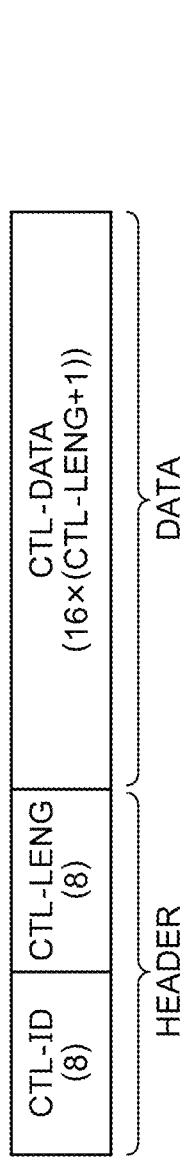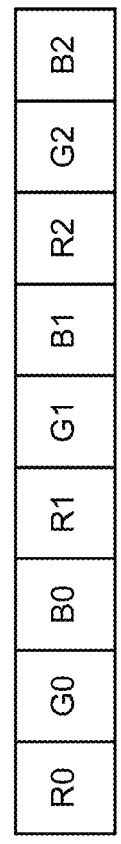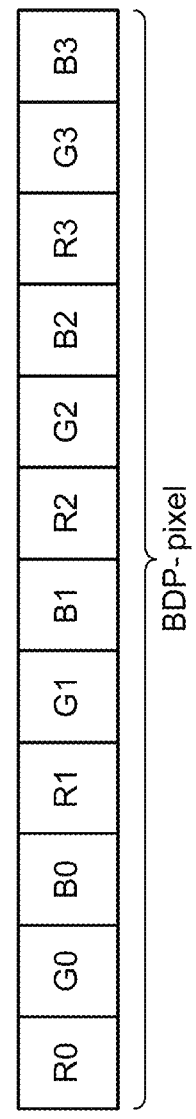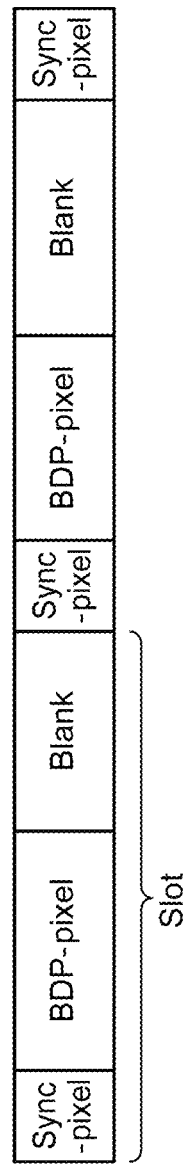
FIG. 5A BDP-cmd BASIC FORMAT
FIG. 5B MAPPING TO RGB
FIG. 5C APPENDING CRC (BDP-pixel)
FIG. 5D SLOT STORAGE

SEMICONDUCTOR APPARATUS

CROSS REFERENCE TO RELATED APPLICATIONS

This application is a continuation under 35 U.S.C. § 120 of PCT/JP2019/001771, filed Jan. 22, 2019, which is incorporated herein reference and which claimed priority to Japanese Application No. 2018-009812, filed Jan. 24, 2018. The present application likewise claims priority under 35 U.S.C. § 119 to Japanese Application No. 2018-009812, filed Jan. 24, 2018, the entire content of which is also incorporated herein by reference.

BACKGROUND

1. Technical Field

The present disclosure relates to a semiconductor apparatus including an interface for a digital video signal.

2. Description of the Related Art

FIG. 1 is a block diagram showing an image display system. An image display system 100R includes a display panel 102 configured as a liquid crystal panel, organic EL panel, or the like, a gate driver 104, a source driver 106, a graphics processor 110, a microcontroller 112, and a timing controller 200. The graphics processor 110 generates video data to be displayed on the display panel 102. Pixel (RGB) data included in the video data is transmitted to the timing controller 200 in a serial format.

The timing controller 200 receives the video data, and generates various kinds of control/synchronization signals. The gate driver 104 sequentially selects the scan lines Ls of the display panel 102 in synchronization with a signal received from the timing controller 200. Furthermore, the RGB data is supplied to the source driver 106.

The timing controller 200 mainly includes a reception circuit 202, a transmission circuit 204, and a logic circuit 210. The reception circuit 202 receives video data in a serial format from the graphics processor 110. The logic circuit 210 generates the control/synchronization signal based on the video data received by the reception circuit 202. The transmission circuit 204 outputs the control signal and the video data to the gate driver 104 and the source driver 106.

The interface circuit 212 is provided in order to allow an external circuit to control the timing controller 200. For example, the interface circuit 212 is configured as an Inter IC ($I^2C$) interface or a Serial Peripheral Interface (SPI), which is accessible from the microcontroller 112 (or graphics processor).

With the image display system 100R shown in FIG. 1, there is a demand for checking whether or not the timing controller 200 operates normally. In a case in which the interface circuit 212 is employed to check the operation of the timing controller 200, increasing the check frequency leads to a problem of an increased load of the microcontroller 112 (or graphics processor).

With the High-Definition Multimedia Interface (HDMI) (trademark) standard or DisplayPort standard, in a blanking period for a frame, which provides an area other than an active area, the graphics processor 110 is allowed to transmit a control signal to the reception circuit 202. Accordingly, the timing controller 200 can be designed so as to allow an external circuit to check the state of the timing controller 200 using such a control signal.

However, a unique specification (protocol) is defined with respect to the control signal for each video interface standard (HDMI standard, DisplayPort standard, etc.). On the other hand, the timing controller 200 is required to have an appropriate lineup of products for each video interface standard. Accordingly, in the design of the timing controller, there is a need to adjust the protocol for each corresponding video standard. This leads to degradation in the utility or versatility of the timing controller 200. The same can be said of the graphics processor 110. That is to say, there is a need to adjust the protocol of the control signal for each video interface standard.

SUMMARY

The present disclosure has been made in order to solve such a problem.

An embodiment of the present disclosure relates to a semiconductor apparatus. The semiconductor apparatus includes: a video input interface structured to receive a digital video signal; a decoder structured to extract a packet command mapped in an RGB data format to a blind area that is included in an active area of the digital video signal, and that is not to be displayed on a display panel, and to decode the packet command; and a processing unit structured to execute processing according to the packet command.

Another embodiment of the present disclosure relates to a graphics processor. The graphics processor includes an encoder structured to map a packet command in an RGB data format to a blind area that is included in an active area of a digital video signal, and that is not to be displayed on a display panel; and a video output interface structured to transmit the digital video signal.

Yet another embodiment of the present disclosure relates to an image processing method. The image processing method includes: in a graphics processor, generating a digital video signal; in the graphics processor, mapping a packet command in an RGB data format to a blind area that is included within an active area of the digital video signal, and that is not to be displayed on a display panel; transmitting the digital video signal from the graphics processor; receiving the digital video signal; extracting a packet command mapped in an RGB data format to a blind area that is included within an active area of the digital video signal, and that is not to be displayed on a display panel, and decoding the packet command; and executing processing according to the packet command.

It is to be noted that any arbitrary combination or rearrangement of the above-described structural components and so forth is effective as and encompassed by the present embodiments. Moreover, all of the features described in this summary are not necessarily required by embodiments so that the embodiment may also be a sub-combination of these described features. In addition, embodiments may have other features not described above.

The description of the items (means for solving the problems) is by no means intended to describe all the indispensable features of the present disclosure. That is to say, any sub-combination of the features as described above is also encompassed in the technical scope of the present disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5A through FIG. 5D are diagrams each showing an example of mapping of a packet command BDP-cmd;

DETAILED DESCRIPTION

Overview of the Embodiments

Figure 1:
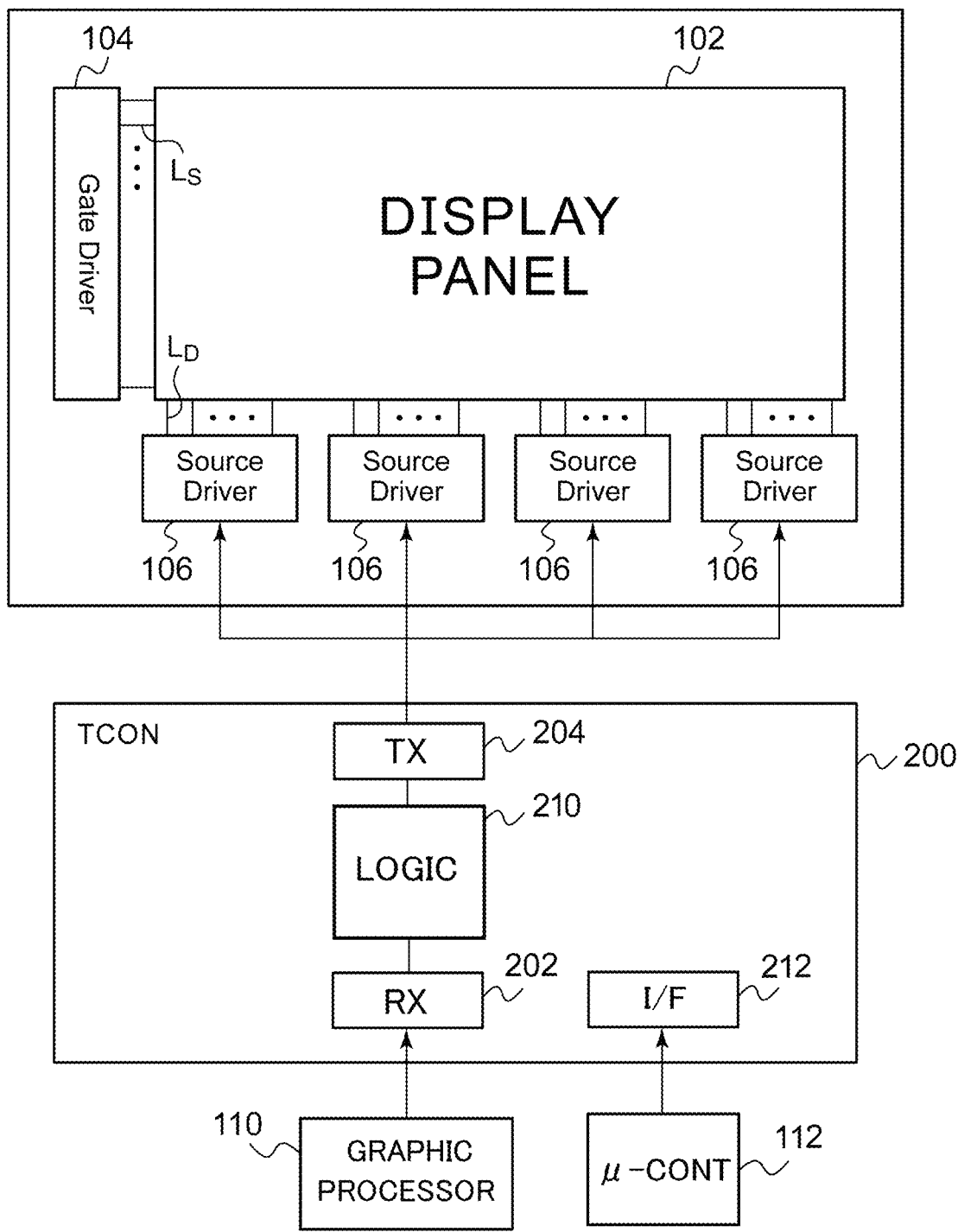
FIG. 1 is a block diagram showing an image display system.

An embodiment disclosed in the present specification relates to a semiconductor apparatus. The semiconductor apparatus includes: a video input interface structured to receive a digital video signal; a decoder structured to extract a packet command mapped in an RGB data format to a blind area that is included in an active area of the digital video signal, and that is not to be displayed on a display panel, and to decode the packet command; and a processing unit structured to execute processing according to the packet command. With this, the video frame is provided with a blind frame. Furthermore, a packet command is mapped to RGB data included in the blind area. This allows the semiconductor apparatus to be controlled based on a common format that does not depend on the video interface standard.

For example, by using such a packet command, this arrangement is capable of supporting an error check function, image comparison function, and status check function.

Error Check

Also, the processing unit may include: a calculation unit structured to calculate a test value with respect to RGB data included in a predetermined region of the digital video signal or a region indicated by a parameter included in the first command when the packet command includes the first command; and a first comparator structured to compare the test value obtained by the calculation unit with an expected value of the test value included in the first command. This arrangement is capable of checking whether or not the digital video signal is transmitted normally.

Also, the test value may be calculated using a Cyclic Redundancy Checking (CRC) method or a checksum method.

Image Comparison

Also, the processing unit may include: memory structured to hold reference graphics data that describes a predetermined image that can be included in the digital video signal; and a second comparator unit structured to compare an image included in a predetermined region of the digital video signal or a region indicated by a parameter included in the second command with the predetermined image. In a case in which the digital video signal includes a predetermined image (graphics, patterns, icons, characters) to be repeatedly displayed, information with respect to the predetermined image is supplied to the semiconductor apparatus side beforehand so as to allow the semiconductor apparatus side to support the image comparison. Such an arrangement is capable of checking whether or not the digital video signal has been transmitted normally.

Status Check

Also, the semiconductor apparatus may further include a register structured to store a predetermined parameter. Also, the processing unit may include a third comparator structured to compare a value stored in the register with a register value expected value included in a third command (status check) when the packet command includes the third command. With this, judgment can be made regarding whether or not the status of the semiconductor apparatus matches a status expected by a processor that generates the digital video signal.

Also, a processing result obtained by the processing unit may be output to an external circuit as an interrupt request (Interrupt Request: IRQ). In this case, this arrangement allows the load of the hardware component to be reduced as compared with an arrangement employing a register-accessing method.

Also, a processing result obtained by the processing unit may be written to a register that is accessible from an external circuit.

The semiconductor apparatus may be configured as a timing controller. Also, the semiconductor apparatus may be configured as a one-chip driver having the functions of a timing controller and a source driver. Also, the semiconductor apparatus may be configured as a bridge circuit. The bridge circuit may be configured to have at least one from among a function of converting a video signal that conforms to a given video interface standard into a video signal that conforms to another video interface standard, a function of distributing a video signal to multiple lines, and a function of selecting one video signal from among the multiple video signals distributed to the multiple lines.

Embodiments

Description will be made below regarding the present disclosure based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present disclosure. Also, it is not necessarily essential for the present disclosure that all the features or a combination thereof be provided as described in the embodiments.

In the present specification, a state represented by the phrase "the member A is coupled to the member B" includes a state in which the member A is indirectly coupled to the member B via another member that does not substantially affect the electric connection between them, or that does not damage the functions of the connection between them, in addition to a state in which they are physically and directly coupled.

Similarly, a state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions of the connection between them, in addition to a state in which they are directly coupled.

Figure 2:
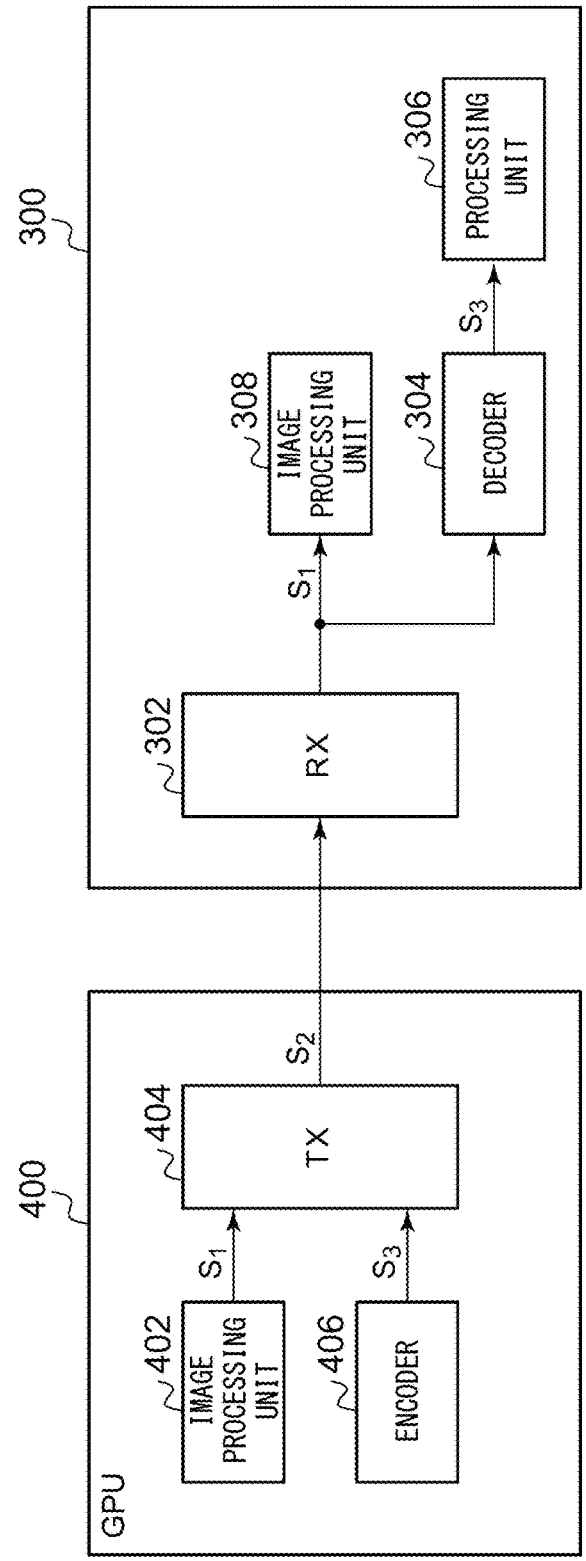
FIG. 2 is a block diagram showing a basic configuration of an image display system comprising a semiconductor apparatus according to an embodiment.

FIG. 2 is a block diagram showing a basic configuration of an image display system 100 including a semiconductor apparatus 300 according to an embodiment. The image display system 100 includes the semiconductor apparatus 300 and a graphics processor 400.

The graphics processor 400 is configured as a Graphics Processing Unit (GPU) or the like, and generates video data. The graphics processor 400 includes an image processing unit 402, a video output interface 404, and an encoder 406. The image processing unit 402 generates video data $S_1$ to be displayed on a display panel (not shown). The video output interface 404 includes a transmitter that conforms to the HDMI standard, DisplayPort standard, or Digital Visual Interface (DVI) standard. The video output interface 404 transmits a digital video signal $S_2$ including the video data $S_1$ in a serial format to the semiconductor apparatus 300.

With the present embodiment, in addition to the video data $S_1$, the graphics processor 400 is capable of transmitting a packet command $S_3$ in a form included in the digital video signal $S_2$ to the semiconductor apparatus 300.

Figure 3:
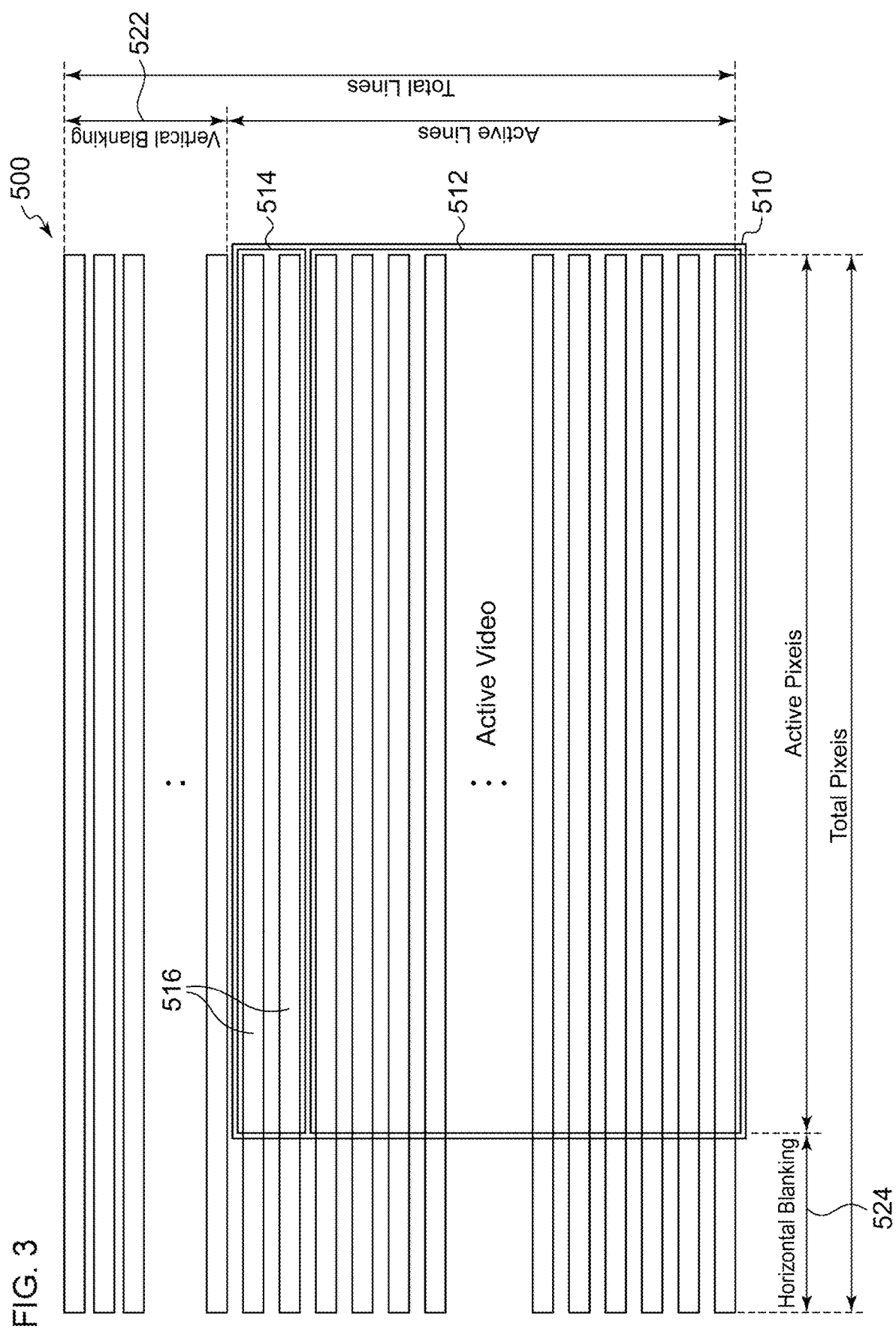
FIG. 3 is a diagram for explaining a digital video signal for one frame.

FIG. 3 is a diagram for explaining a digital video signal 500 for each frame. The digital video signal 500 includes an active area (Active Video Region) 510 and a blanking area (Blanking Region) 520 that is an area other than the active area. The blanking area 520 includes a vertical blanking area 522 and a horizontal blanking area 524.

The vertical blanking area 522 corresponds to the first several lines from among the total lines for each frame. The horizontal blanking area 524 corresponds to the first several pixels from among the total pixels for each line.

In the present embodiment, the active area 510 includes a display area 512 to be displayed on the display panel (i.e., to be displayed for the user), and an area (blind area) 514 that is not to be displayed on a display (i.e., that is not to be displayed for the user). In an example shown in FIG. 3, the first two lines of the active area 510 are assigned to the blind area 514. The two lines will be referred to as "blind data lines 516".

The video data $S_1$ is mapped in the RGB format to the display area 512. In the same manner, the packet command $S_3$ is mapped in the RGB format to the blind area 514.

Figure 4:
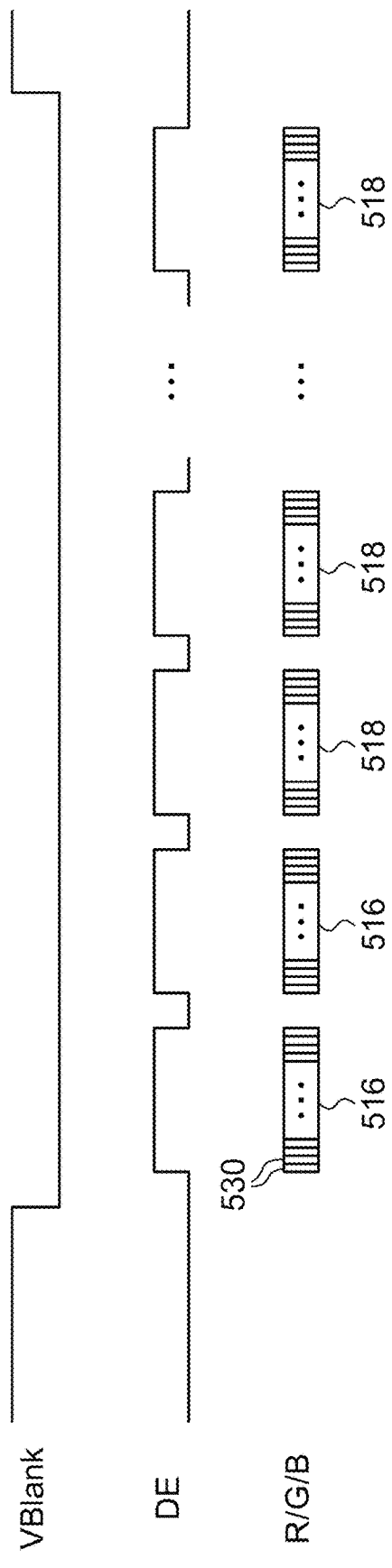
FIG. 4 is a diagram for explaining the transmission of a digital video signal.

FIG. 4 is a diagram for explaining the transmission of the digital video signal 500. During a period that corresponds to the vertical blanking area 522 for one frame period for transmitting the digital video signal 500, a vertical blanking signal VBlank is asserted (set to the high level). When the vertical blanking signal VBlank is negated (set to the low level), transmission of active lines that correspond to the active area 510 is started.

When the vertical blanking signal VBlank is negated (set to the low level), the blind data lines 516 included in the blind area 514 positioned as the first area of the active area 510 are transmitted. Subsequently, display lines 518 included in the display area 512 are transmitted. During a period in which the active pixels are transmitted, a data enable signal DE (or VDE) is asserted (set to the high level). The blind data lines 516 and the display lines 518 each include multiple pixel data 530. Each pixel data includes RGB data.

Returning to FIG. 2, the encoder 406 maps the packet command $S_3$ in the RGB data format to the blind data lines 516 that correspond to the blind area. The video output interface 404 transmits the digital video signal $S_2$ including the video data $S_1$ and the packet command $S_3$ to the semiconductor apparatus 300.

The semiconductor apparatus 300 may be configured as various kinds of devices including a video input interface that allows the digital video signal $S_2$ to be received from the graphics processor 400. The kind of the semiconductor apparatus 300 is not restricted in particular.

The semiconductor apparatus 300 includes a video input interface 302, a decoder 304, and a processing unit 306. The video input interface 302 receives the digital video signal $S_2$. The decoder 304 extracts the packet command $S_3$ mapped in the RGB data format to the blind data lines included in the digital video signal $S_2$, and decodes the packet command $S_3$. The processing unit 306 executes processing according to the packet command $S_3$ extracted by the decoder 304. The video data $S_1$ included in the digital video signal $S_2$ received by the video input interface 302 is supplied to the image processing unit 308. The image processing unit 308 executes processing required for the semiconductor apparatus 300 on the video data $S_1$.

FIG. 5A through FIG. 5D are diagrams for explaining an example of the mapping of the packet command BDP-cmd. FIG. 5A shows a basic format of the packet command BDP-cmd. The packet command BDP-cmd includes a header (HEADER) and data (DATA). The header includes a control identifier (CTL-ID) that indicates the type of the command and a command length (CTL_LENG). The data includes control data (CTL-DATA). For example, 8 bits of data are assigned to the control identifier and the command length. The number of bits of the control data (CTL_DATA) corresponds to the value indicated by the command length (CTL-LENG). For example, the number of bits of the control data is 16×(CTL−LENG+1).

As shown in FIG. 5B, the packet command BDP-cmd shown in FIG. 5A is mapped as RGB data. For example, the bits included in the header of the packet command BDP-cmd are mapped to the RGB data of the first pixel (R0, G0, B0). Furthermore, the bits included in the data of the packet command BDP-cmd are mapped to the RGB data of the second pixel (R1, G1, B1) and the RGB data of the third pixel (R2, G2, B2).

In order to allow the receiver side to verify whether or not the packet command has been received correctly, CRC bits are appended. FIG. 5C shows pixel data (which will be referred to as the "BDP pixel data") including the cyclic redundancy code (CRC) data as appended data. The CRC data is mapped to the RGB data of the fourth pixel (R3, G3, B3) or a subsequent pixel of the BDP pixel data. It should be noted that the CRC data is provided in order to allow the receiver to check whether or not the packet command $S_3$ has been transmitted correctly. That is to say, the CRC data should not be confused with the check using a packet command described later.

As shown in FIG. 5D, the BDP pixel data shown in FIG. 5C is stored in a slot (Slot). The slot includes synchronization pixel data (Sync-pixel), the BDP pixel data, and the blanking data (Blank).

Figure 6A:
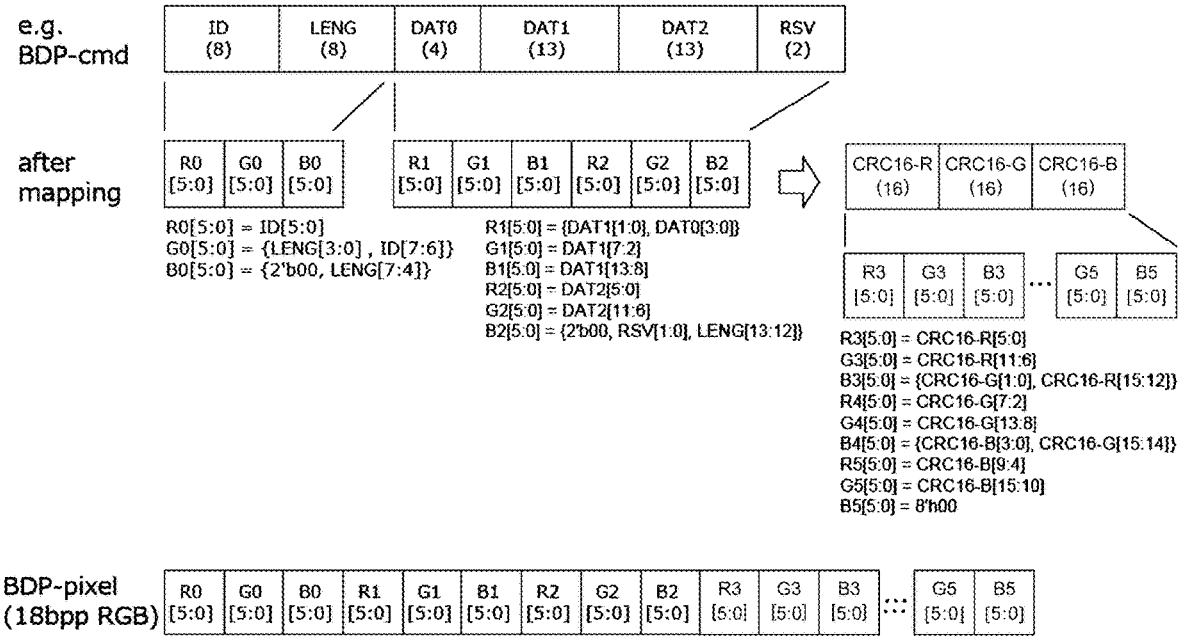
FIG. 6A and FIG. 6B are diagrams each showing a specific example of packet mapping.
Figure 6B:
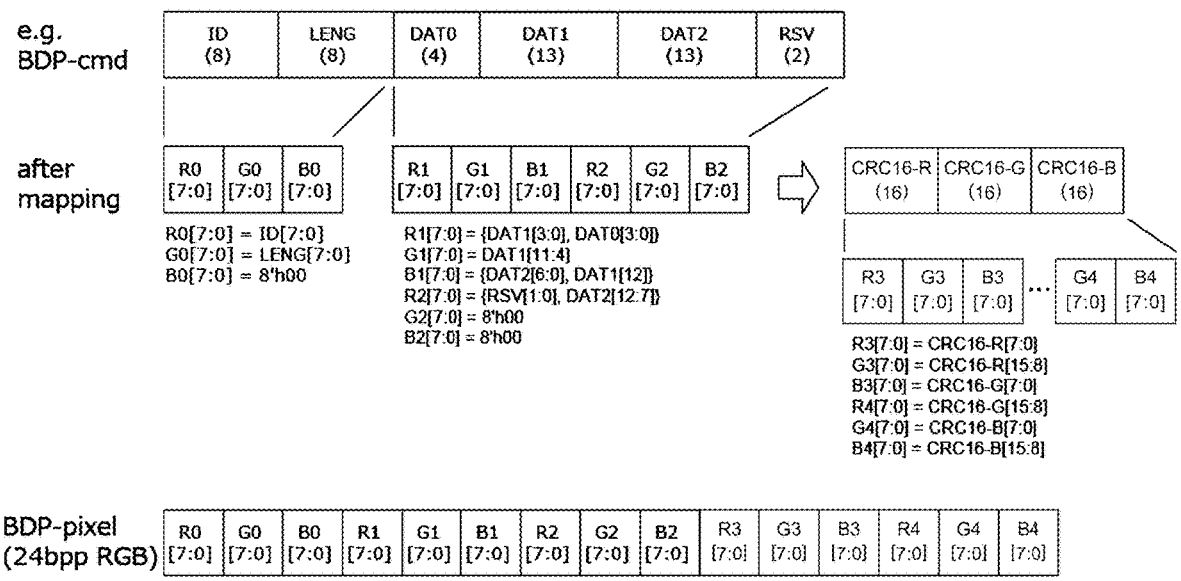

FIG. 6A and FIG. 6B are diagrams each showing a specific example of the packet mapping. The control identifier (CTL-ID) and the command length (CTL-LENG) included in the header are each configured as 8 bits of data. Accordingly, the sum total of the number of bits of the identifier and the command length is 16 bits.

Furthermore, the data is configured as a total of 32 bits of data including DAT0 (4 bits), DAT1 (13 bits), DAT2 (13 bits), and RSV (2 bits). The parameters to be assigned to DAT0, DAT1, DAT1, and RSV may preferably be determined for each type of command.

FIG. 6A shows an example in which an 18-bpp (bit per pixel) format is employed. That is to say, the R, G, and B data are each configured as 6 bits of data. The 16 bits included in the header are assigned to the R0, G0, and B0 data configured as 18 bits of data in a left-justified manner. It is needless to say that the 16 bits of data may be assigned in a right justified manner.

Furthermore, the 32 bits of data included in the data are assigned in a left-justified manner to R1, G1, and B1 of the second pixel and R2, G2, and B2 of the third pixel, configured as 36 bits of data.

For example, CRC data may be calculated independently for each of the R, G, and B data after the mapping of the header and the data. Description will be made regarding an example assuming that CRC16 is employed. The CRC value calculated for R (G, B) will be represented by "CRC16-R (CRC16-G, CRC16-B). The CRC data calculated for each of the R, G, and B data is configured as 16 bits of data. Accordingly, the total CRC data includes 48 bits of data. The total CRC data is mapped to the fourth pixel through the sixth pixel (54 pixels).

FIG. 6B shows an example employing the 24-bpp format. In this example, the CRC data is assigned to the fourth pixel (R3, G3, B3) and the fifth pixel (R4, G4, B4).

Figure 7:
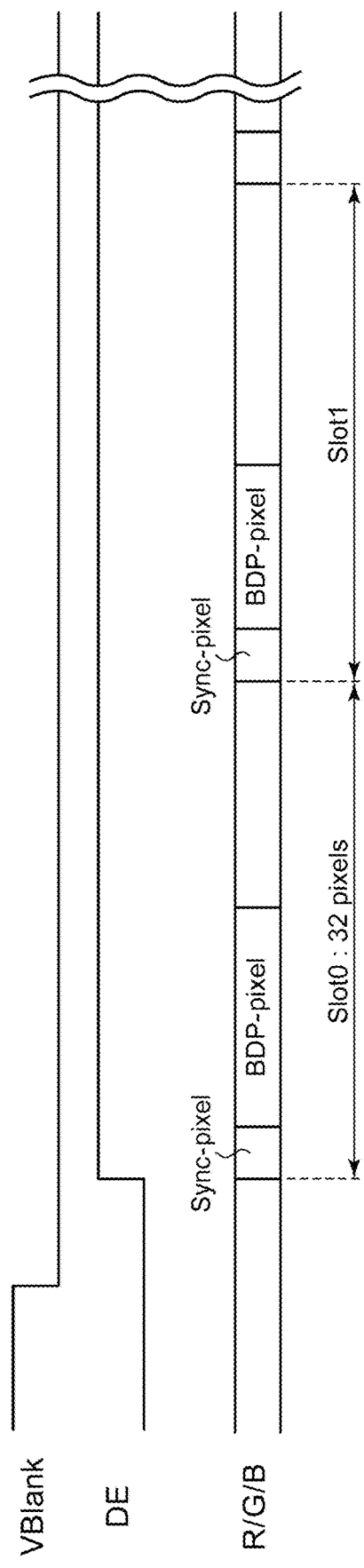
FIG. 7 is a diagram showing an example of a format of a blind data line.

FIG. 7 is a diagram showing an example of the blind data line format. The number of the blind data lines may be increased up to a maximum of seven. The same command may be stored in a single line or multiple lines. This arrangement provides improved redundancy.

A synchronization pixel (Sync-pixel) is periodically inserted into the blind data line. For example, the synchronization pixel is configured to have a fixed length of one pixel.

The first synchronization pixel is arranged as the first pixel of the blind data line. Subsequent synchronization pixels may be inserted for every predetermined cycle (e.g., a 32-pixel cycle). The data region from a given synchronization pixel up to the next synchronization pixel is defined as a "slot". The number of slots is the maximum number of packets included in each frame. The BDP pixel data is stored starting from the pixel next to the synchronization pixel. It should be noted that a slot having no BDP pixel data may be arranged at an intermediate position on a given line. When the first synchronization pixel has not been detected, the receiver side may discard the decoding of the blind data lines included in the corresponding frame. When an intermediate synchronization pixel, which is the subsequent synchronization pixel, has not been detected, the receiver side may discard the decoding of the corresponding slot.

When the receiver-side decoder has failed to detect the synchronization pixel, the receiver-side decoder may store the corresponding slot number in a register that is accessible from the graphics processor 400. By reading the register data, this arrangement allows the graphics processor 400 to obtain the information with respect to the slot number in which an error has occurred.

It should be noted that two (or more) kinds of synchronization pixels may be prepared. This allows BDP pixel data having a large data length to be stored over multiple slots.

With the embodiment, the video frame is provided with the blind area. Furthermore, the packet command is mapped to the RGB data included in the blind area. This arrangement allows the semiconductor apparatus 300 to be controlled in a common format without depending on the video interface standard.

Next, description will be made regarding a specific example of the packet command.

Error Check

Figure 8A:
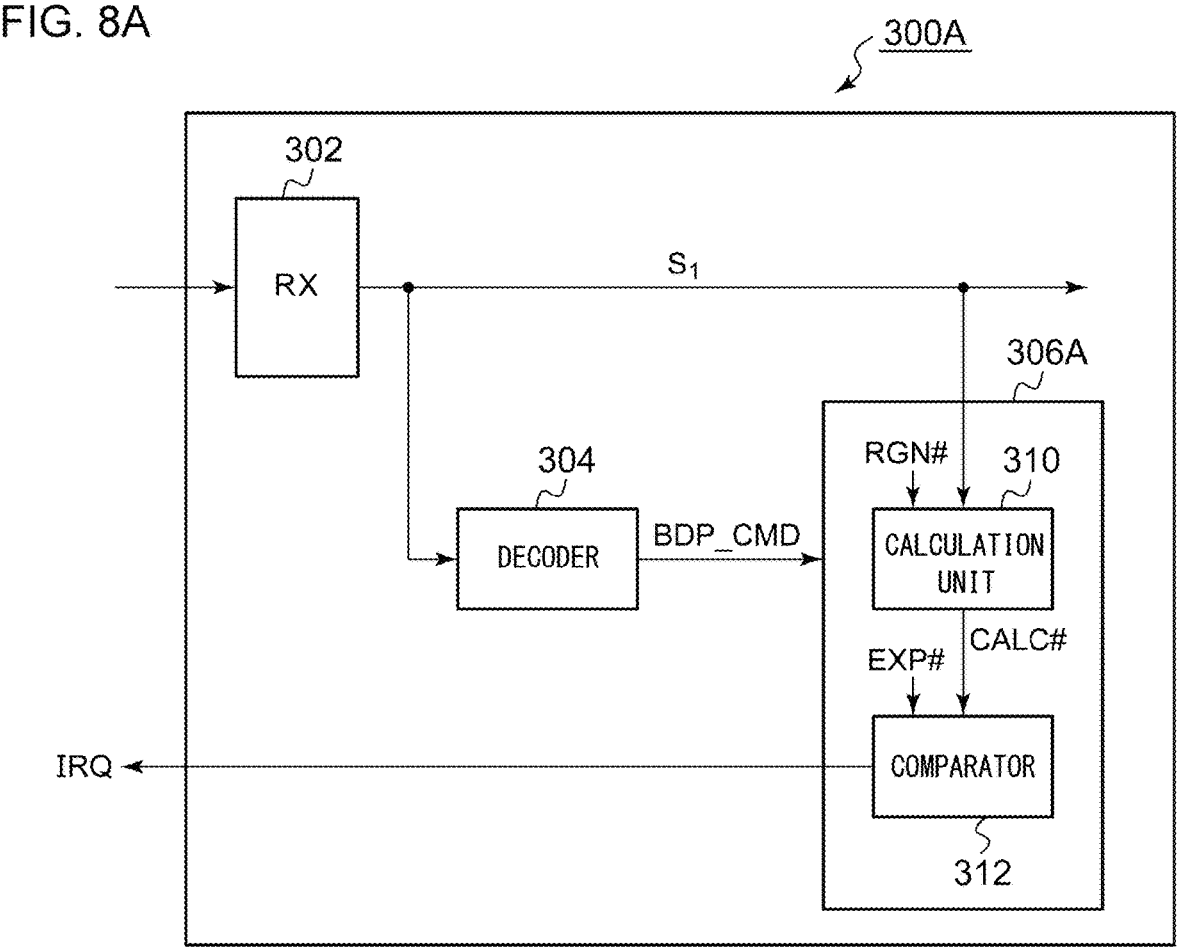
FIG. 8A is a diagram showing a semiconductor apparatus that supports an error check command.

FIG. 8A is a diagram showing a semiconductor apparatus 300A that supports an error check command. A processing unit 306A shown in FIG. 8A supports a first command for error checking. The processing unit 306A includes a calculation unit 310 and a first comparator 312. When the packet command BDP-cmd includes a first command (error check command), the calculation unit 310 calculates a test value with respect to the RGB data included in a predetermined region of a digital video signal (video data $S_1$) or a region indicated by a parameter included in the first command. Description will be made in this example assuming that the CRC method is employed. The first command includes a data portion including an expected value of the test value. The first comparator 312 compares the calculation value CALC calculated by the calculation unit 310 with an expected value EXP included in the first command.

Figure 8B:
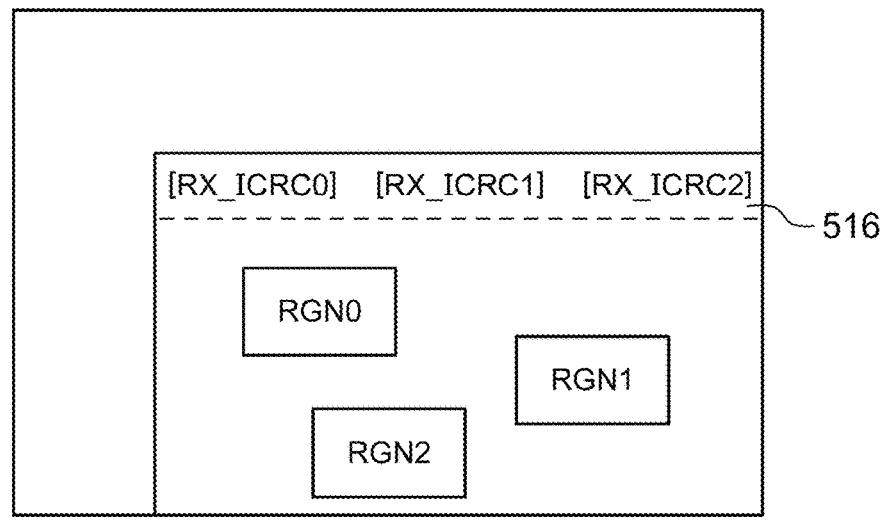
FIG. 8B is a diagram for explaining an error check operation.

FIG. 8B is a diagram for explaining the error check operation. In this example, the blind data line 516 includes three first commands RX_ICRC0 through RX_ICRC2, which designate three areas as the check targets. Each command RX_ICRC # (#=0, 1, 2) is configured to have a data portion including a parameter that designates the corresponding target area RGN # and the expected value EXP # of the corresponding CRC value.

By supporting such an error check command, this arrangement is capable of judging whether or not each frame is transmitted correctly. The processing unit 306A outputs the comparison result to an external circuit in the form of an interrupt request IRQ. For example, when an error has been detected, an interrupt is issued to the graphics processor 400. With this, there is no need to involve register access for every check operation (for every frame), thereby reducing the load.

It should be noted that, instead of the Cyclic Redundancy Checking (CRC) method, other kinds of methods such as the checksum method or the like may be employed to calculate the test value. Also, an arrangement may be made in which multiple areas can be designated using a single first command.

Image Comparison

Figure 9:
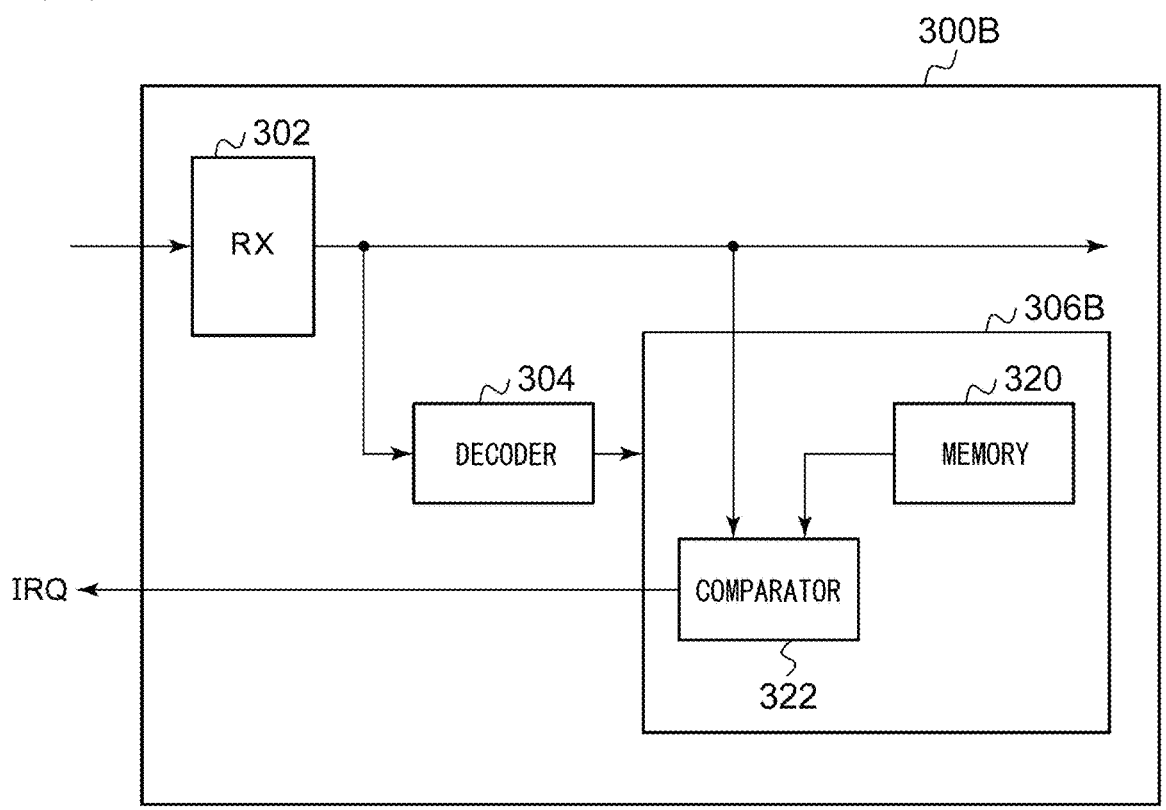
FIG. 9 is a diagram showing a semiconductor apparatus that supports an image comparison command.

FIG. 9 is a diagram showing a semiconductor apparatus 300B that supports an image comparison command. A processing unit 306B shown in FIG. 9 supports a second command for image comparison. The processing unit 306B includes memory 320 and a second comparator unit 322.

The same images (graphics, patterns, icons, characters) are repeatedly generated in a video image. Accordingly, such a predetermined image to be repeatedly used is defined as a reference graphics image. Furthermore, reference graphics data that describes such a predetermined image is stored in the memory 320 beforehand. The reference graphics data may be read from an external circuit in the start-up operation of the semiconductor apparatus 300. Alternatively, the semiconductor apparatus 300 may hold the reference graphics data in a nonvolatile manner.

When the packet command BDP-cmd includes the second command, the second comparator unit 322 compares an image included in a predetermined region of the digital video signal (video data $S_1$) with a predetermined image (i.e., expected value) reproduced from the reference graphics data stored in the memory 320. The comparison result is output as an interrupt request IRQ.

In a case in which such a predetermined image is generated at a different position for each frame, the second command may be designed such that its data portion includes a parameter that indicates the position at which the predetermined image is to be generated.

As described above, in a case in which the digital video signal includes a predetermined image (graphics, patterns, icons, characters) to be repeatedly generated, the information with respect to such a predetermined image is supplied to the semiconductor apparatus side, and the semiconductor apparatus side compares the generated predetermined image with the predetermined image information. This arrangement allows the semiconductor apparatus side to check whether or not the digital video signal has been transmitted normally.

Status Check

Figure 10:
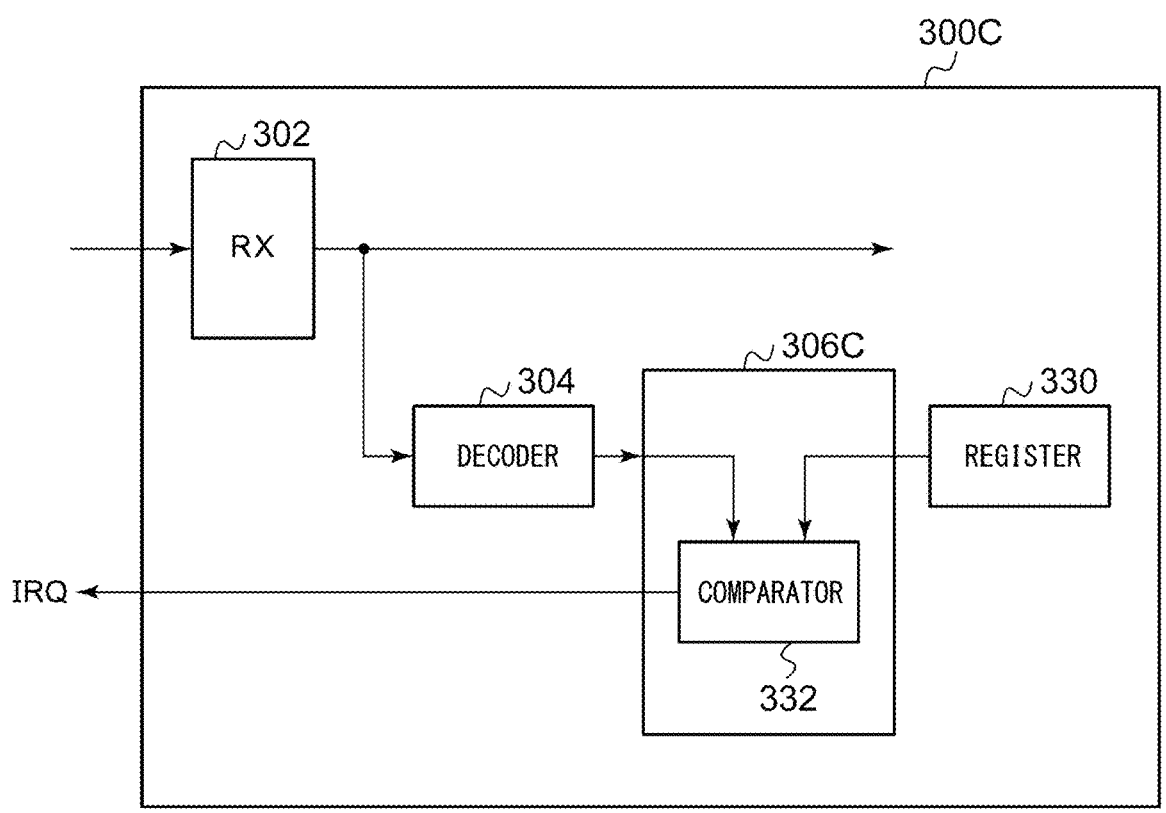
FIG. 10 is a diagram showing a semiconductor apparatus that supports a status check command.

FIG. 10 is a diagram showing a semiconductor apparatus 300C that supports a status check command. A processing unit 306C supports a third command for a status check. The processing unit 306C includes a register 330 and a third comparator unit 332.

The register 330 stores a parameter that indicates the status of the semiconductor apparatus 330. The status to be indicated by the parameter is not restricted in particular.

When the packet command BDP-cmd includes the third command (status check), the third comparator unit 332 compares the value stored in the register 320 with an expected value of the register value included in the third command. The data portion of the third command may include a register address to be checked. This arrangement allows the third comparator unit 332 to access the indicated address and to compare the value stored at the address with the expected value.

This allows the status of the semiconductor apparatus 300C to be checked for whether or not it matches the status expected by the graphics processor 400.

Figure 11A:
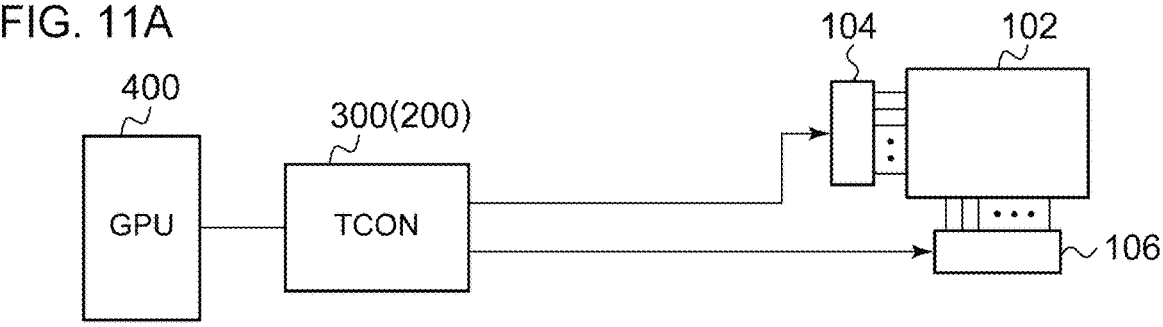
FIG. 11A through FIG. 11D are diagrams each showing a specific application of the semiconductor apparatus.

FIG. 11A through FIG. 11D are diagrams each showing a specific application of the semiconductor apparatus 300. FIG. 11A shows an example in which the semiconductor apparatus 300 is configured as a timing controller 200. The timing controller 200 receives the digital video signal $S_2$ from the graphics processor 400, and controls the gate driver 104 and the source driver 106.

Figure 11B:
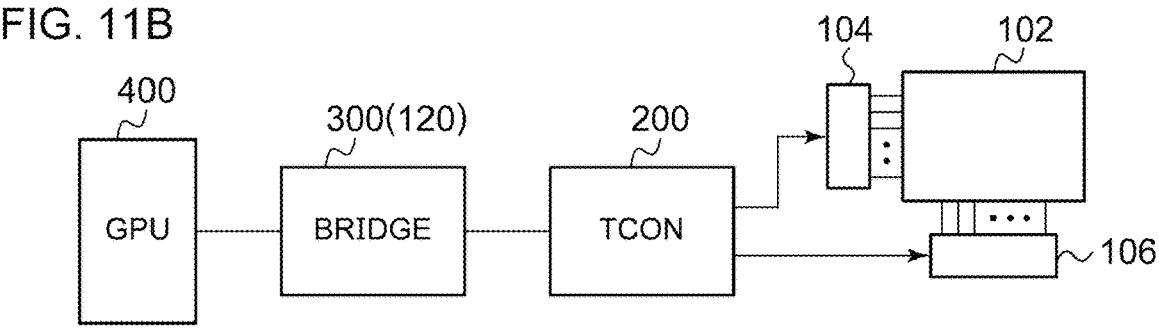

FIG. 11B shows an example in which the semiconductor apparatus 300 is configured as a bridge chip 120. The bridge chip 120 is arranged between the graphics processor 400 and the timing controller 200. The bridge chip 120 functions as a bridge between an output interface of the graphics processor 400 and an input interface of the timing controller 200.

Figure 11C:
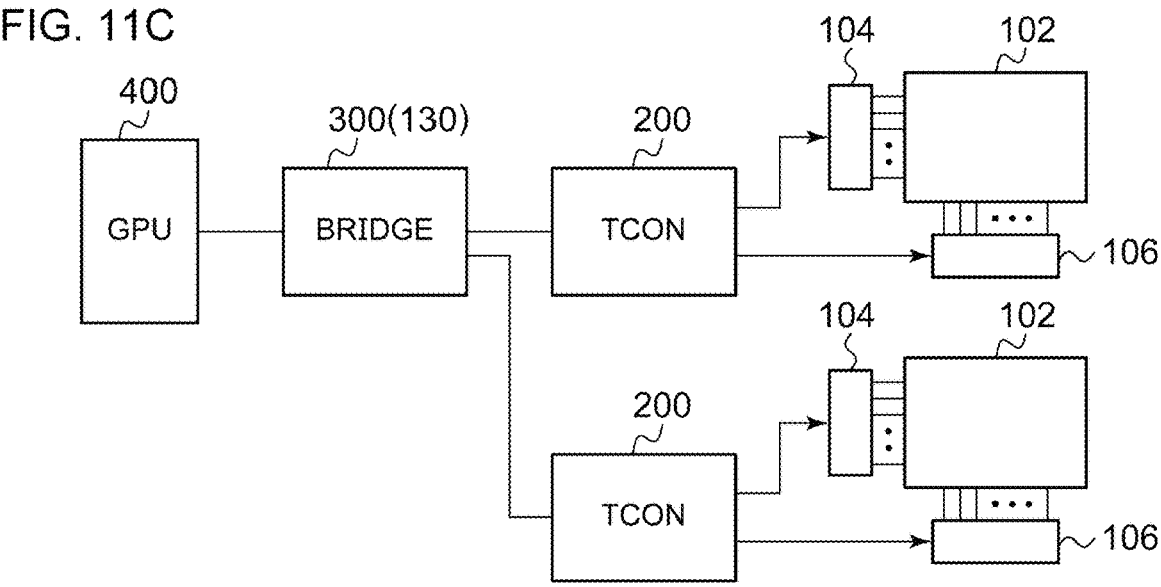

FIG. 11C shows an example in which the semiconductor apparatus 300 is configured as a bridge chip 130. The bridge chip 130 branches the video signal received from the graphics processor 400 into multiple lines. The bridge chip 130 may distribute the same video signal as the input video signal to multiple lines. Alternatively, the bridge chip 130 may divide the input video signal into multiple regions (screens), and may distribute the multiple regions to the respective multiple lines.

Figure 11D:
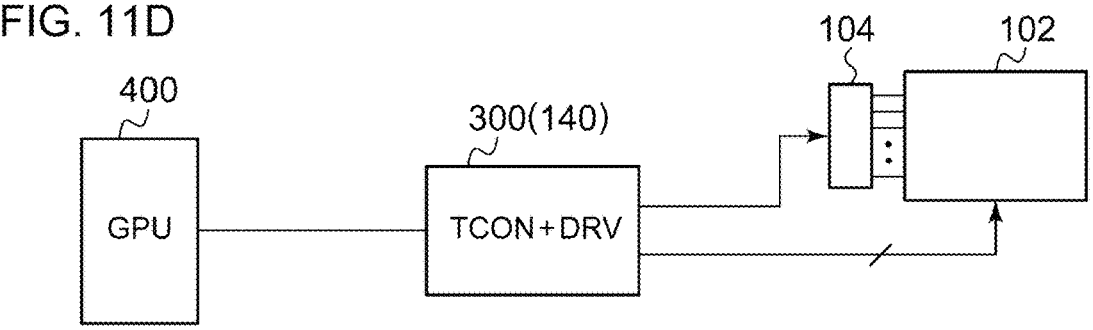

FIG. 11D shows an example in which the semiconductor apparatus 300 is configured as a one-chip driver 140. The one-chip driver 140 has a function of a timing controller and a display driver (source driver).

The image display systems shown in FIG. 11A through FIG. 11D can be employed for various kinds of display apparatuses such as in-vehicle displays, medical displays, TVs, PC displays, etc. Also, the image display system may be built into various kinds of electronic devices such as laptop computers, tablet terminals, smartphones, digital still cameras, digital video cameras, etc.

Description has been made above regarding the present disclosure with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present disclosure. Description will be made below regarding such modifications.

Description has been made with reference to FIG. 8A and FIG. 8B through FIG. 10 regarding an arrangement in which the processing result received from the processing unit 306 is output in the form of an interrupt request. However, the present disclosure is not restricted to such an arrangement. Also, the processing result may be stored in a register that is accessible from an external circuit.

The semiconductor apparatus 300 may be configured to support two or more commands from among the three commands described in the embodiment. Also, the type of each command is not restricted to the examples as described above. That is to say, various types of commands and processing may be defined.

Description has been made regarding the present disclosure with reference to the embodiments using specific terms. However, the above-described embodiments show only the mechanisms and applications of the present disclosure for exemplary purposes only, and are by no means intended to be interpreted restrictively. Rather, various modifications and various changes in the layout can be made without departing from the spirit and scope of the present disclosure defined in appended claims.

What is claimed is:

1. A semiconductor apparatus comprising:
a video input interface structured to receive a digital video signal;
a decoder structured to extract a packet command mapped in an RGB data format to a blind area that is included in an active area of the digital video signal, and that is not to be displayed on a display panel, and to decode the packet command; and
a processing unit structured to execute processing according to the packet command and comprise:
a memory structured to hold reference graphics data that describes a predetermined image that is repeatedly shown and can be included in the digital video signal; and
a comparator unit structured to compare an image included in a predetermined region of the digital video signal or a region indicated by a parameter included in an image comparison command with the predetermined image.

2. The semiconductor apparatus according to claim 1, wherein the processing unit comprises:
a calculation unit structured to calculate a test value with respect to RGB data included in a predetermined region of the digital video signal or a region indicated by a parameter included in a first command when the packet command includes the first command; and
a first comparator structured to compare the test value obtained by the calculation unit with an expected value of the test value included in the first command.

3. The semiconductor apparatus according to claim 2, wherein the test value is calculated using a Cyclic Redundancy Checking (CRC) method or a checksum method.

4. The semiconductor apparatus according to claim 1, wherein a processing result obtained by the processing unit is output to an external circuit as an interrupt request.

5. The semiconductor apparatus according to claim 1, wherein a processing result obtained by the processing unit is written to a register that is accessible from an external circuit.

6. The semiconductor apparatus according to claim 1, structured as a timing controller.

7. The semiconductor apparatus according to claim 1, structured as a one-chip driver having a function as a timing controller and a function as a source driver.

8. The semiconductor apparatus according to claim 1, structured as a bridge circuit.

9. A display apparatus comprising the semiconductor apparatus according to claim 1.

10. A semiconductor apparatus comprising:
a video input interface structured to receive a digital video signal;
a decoder structured to extract a packet command mapped in an RGB data format to a blind area that is included in an active area of the digital video signal, and that is not to be displayed on a display panel, and to decode the packet command;
a processing unit structured to execute processing according to the packet command; and
a register structured to store a predetermined parameter, wherein the processing unit comprises a comparator structured to compare a value stored in the register with an expected value of a register value included in a status check command in response to the packet command including the status check command.

11. An electronic device comprising:
a graphics processor structured to generate a digital video signal:
a display panel: and
a semiconductor apparatus structured to control the display panel based on the digital video signal, wherein the semiconductor apparatus comprises:
a video input interface structured to receive the digital video signal from the graphics processor;
a decoder structured to extract a packet command mapped in an RGB data format to a blind area that is included in an active area of the digital video signal, and that is not to be displayed on the display panel, and to decode the packet command; and
a processing unit structured to execute processing according to the packet command, the processing unit comprising:
a memory structured to hold reference graphics data that describes a predetermined image that is repeatedly shown and can be included in the digital video signal; and
a comparator unit structured to compare an image included in a predetermined region of the digital video signal or a region indicated by a parameter included in an image comparison command with the predetermined image.

* * * * *